US012798133B2

United States Patent

Kokozidis

(12) United States Patent
(10) Patent No.: US 12,798,133 B2
(45) Date of Patent: Nov. 17, 2026

(54) SHAVING HEAD

(71) Applicant: BIC Violex Single Member S.A., Anoixi (GR)

(72) Inventor: Michail Kokozidis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 587 days.

(21) Appl. No.: 18/360,464

(22) Filed: Jul. 27, 2023

(65) Prior Publication Data

US 2024/0033959 A1 Feb. 1, 2024

(30) Foreign Application Priority Data

Jul. 29, 2022 (EP) .................................... 22187842

(51) Int. Cl.

*B26B 21/40* (2006.01)
*B26B 21/52* (2006.01)

(52) U.S. Cl.

CPC ...... *B26B 21/4062* (2013.01); *B26B 21/4031* (2013.01); *B26B 21/4056* (2013.01); *B26B 21/526* (2013.01)

(58) Field of Classification Search

CPC . B26B 21/4062; B26B 21/4056; B26B 21/00; B26B 21/405; B26B 21/565;

(Continued)

(56) References Cited

U.S. PATENT DOCUMENTS 4,460,854 A 7/1984 Bauer
6,760,144 B2 * 7/2004 Hill ....................... B81B 3/0062 310/90

(Continued)

FOREIGN PATENT DOCUMENTS

CN 113631336 A 11/2021
DE 9005626 U1 8/1990

(Continued)

OTHER PUBLICATIONS

WO03095157A1_EnglishMachine TranslatedDocument (Year: 2003).*
Search Report issued in European Application No. 22187842.4, issued on Dec. 20, 2022.

*Primary Examiner* — Ghassem Alie

(74) *Attorney, Agent, or Firm* — Bookoff McAndrews, PLLC

(57) ABSTRACT

In a first aspect, the present disclosure relates to a shaving head comprising:

a housing, one or more cutting members, comprising a base portion and a blade mounting portion connected to the base portion and extending at an angle therefrom, wherein a blade with a cutting edge portion is connected to the blade mounting portion, one or more base parts configured to hold one cutting member and to couple it to the housing, wherein the base portion is arranged in the one or more base parts rotatably around an axis of rotation extending in parallel to the cutting edge portion, and wherein the one or more base parts comprise an actuator which is configured to rotate the cutting member around the axis of rotation thereby varying a shaving angle of the blade, wherein the shaving angle is an angle between a blade and shaving plane of the shaving head.

20 Claims, 3 Drawing Sheets

(58) Field of Classification Search

CPC .......... H02N 1/10; H02N 1/006; H02N 1/008; G02B 26/08; G02B 26/0841

USPC .................... 83/13; 30/32, 43, 346–350, 53; 361/280; 310/300, 309, 311

See application file for complete search history.

(56) References Cited

U.S. PATENT DOCUMENTS

| | | | | |
|---|---|---|---|---|
| 8,479,624 | B2 * | 7/2013 | Flyash | .................... B26B 21/48 83/13 |
| 9,789,618 | B2 * | 10/2017 | Bozikis | ................... B26B 21/14 |
| 10,179,418 | B2 * | 1/2019 | Hendriks | ............. A61B 18/203 |
| 2004/0098862 | A1 | 5/2004 | Orloff | |
| 2006/0201001 | A1 | 9/2006 | Teeuw et al. | |
| 2008/0098603 | A1 | 5/2008 | Noble et al. | |
| 2008/0172880 | A1 | 7/2008 | Freund et al. | |
| 2014/0026423 | A1 | 1/2014 | Schnak et al. | |
| 2014/0237827 | A1 | 8/2014 | Culf | |
| 2014/0345142 | A1 | 11/2014 | Damkat et al. | |
| 2015/0128776 | A1 * | 5/2015 | Zuidervaart | .......... B26B 19/388 30/34.2 |
| 2016/0167241 | A1 | 6/2016 | Goldfarb et al. | |
| 2019/0224867 | A1 | 7/2019 | Robinson et al. | |
| 2019/0306259 | A1 * | 10/2019 | Burghardt | ........... B26B 21/4081 |
| 2020/0316799 | A1 | 10/2020 | Tsegenidis et al. | |

FOREIGN PATENT DOCUMENTS

| | | | | |
|---|---|---|---|---|
| EP | 0906814 | A1 | 4/1999 | |
| WO | 9119597 | A1 | 12/1991 | |
| WO | 9504637 | A1 | 2/1995 | |
| WO | 9529798 | A1 | 11/1995 | |
| WO | 9805478 | A1 | 2/1998 | |
| WO | WO-03095157 | A1 * | 11/2003 | ............. B26B 19/00 |
| WO | WO-2012070038 | A1 * | 5/2012 | ......... B26B 21/4062 |

* cited by examiner

SHAVING HEAD

CROSS REFERENCE TO RELATED APPLICATIONS

This application claims priority from European patent application EP 22187842.4, filed on Jul. 29, 2022, the entirety of which is incorporated herein by reference.

TECHNICAL FIELD

The present disclosure relates to shaving heads, kits of parts and methods of operating a razor.

BACKGROUND

Safety razors with multiple blades have been known for quite some time. However, people have different sensitivity against shaving induced pain (or pain in general). Even as a preference or experimentation, although shaving angles of 18° to 23° have been found to be optimal, many people want to try different angles but without an option for an automated and repeatable angle adjustment. Also, a lot of people expect different shaving experience in terms of comfort, feeling and performance, usually related also to cultural habits.

Although the shaving angle is a factor that greatly affects the above, conventional cartridge razors provide a specific shaving angle in their shavers. Developments in the cartridge razor field offer shaving angle adjustability but in a limited way with manual adjustments and mechanisms.

On the other hand, manual razors i.e., usually using exchangeable double edge blades do offer the ability to control the shaving angle but require a long and difficult learning curve, one that cannot result in a stable angle control.

SUMMARY

In a first general aspect, the present disclosure relates to a shaving head comprising a housing, one or more cutting members, comprising a base portion and a blade mounting portion connected to the base portion and extending at an angle therefrom, wherein a blade with a cutting edge portion is connected to the blade mounting portion, one or more base parts configured to hold one cutting member and to couple it to the housing, wherein the base portion is arranged in the one or more base parts rotatably around an axis of rotation extending in parallel to the cutting edge portion, and wherein the one or more base parts comprise an actuator which is configured to rotate the cutting member around the axis of rotation thereby varying a shaving angle of the blade, wherein the shaving angle is an angle between a blade and shaving plane of the shaving head.

In a second general aspect, the present disclosure relates to a kit of parts, comprising a shaving head according to any one of the preceding aspects, and a razor handle wherein the shaving head is coupled to the razor handle.

In a third general aspect, the present disclosure relates to a method of operating a razor, comprising the steps of:

a) providing a razor with a shaving head comprising one or more cutting members each comprising a base portion and a blade mounting portion connected to the base portion and extending at an angle therefrom, wherein a blade with a cutting edge portion is connected to the blade mounting portion,
b) performing a shaving operation with the razor, wherein the shaving head is configured to cut hair of a user, c) rotating the one or more cutting members around an axis of rotation extending in parallel to the cutting edge portion by an actuator, thereby varying a shaving angle of the blade.
d) assembling direction until the razor handle and the razor head holder are disconnected.

Particular examples of the first to third general aspects can be implemented so as to realize one or more of the following advantages.

First, the shaving angle stabilization or automated control of the shaving angle can answer the issue of blade angle variability during shaving due to the tolerance in blade holding slots and under exerted shaving forces. A precise and repeatable control of the blade angle is provided.

Second, the present disclosure enables a shaver to provide automated, precise and repeatable shaving angle control, through a combined electrostatic actuator and piezoelectric sensor system.

Third, a closed loop feedback between the electrostatic actuator and a pressure sensor enables to constantly match user preferences in terms of sensitivity.

Fourth, the blade control base can be a platform to match different requirements, apart from the automated control, e.g., such as:

a. Pre-defined settings for easy change, experimentation, and customization of the shaving experience with high repeatability and stability.
b. Easy rinse-ability activation.
c. Shaving angle stabilization.

Certain terms are used in the following manner in the present disclosure:

The expression "Shaving Angle" is the angle that blades form versus the shaving plane which is the plane of the shaving head and can be defined by a tangential line intersecting the highest points of the shaving head which may be a lubra strip and a guard bar of the shaving head. In another example, the shaving plane may be defined as a plane intersecting the cutting edges of the blades.

The expression "Shaving Forces" are the forces developed between the blade edge and the hair or skin during cutting or generally the forces exerted on the blade during shaving.

The expression "User experience panel" refers to a panel of users selected through specific methodology, with the scope to test products and provide feedback, in order to provide statistical insights to specific parameters of the products and their respective use.

The expression "connected to" is not limited to a direct connection between two objects (i.e., it is not required that the two objects abut). For instance, a first object and a second object can be indirectly connected through a third object (e.g., a cutting edge portion can be indirectly connected to an edge of the base portion through another component such as a blade mounting portion).

The expression "extending at an angle" relates to an angle which is smaller than 180° (e.g., smaller than 160°). Moreover, the expression "extending at an angle" specifies that the first object extending at an angle and the second object from which the first object extends inscribe the angle (e.g., the base portion extends in a first vertical direction and the cutting edge portions and the base portion define an inscribed angle). The expression "extending at an angle" includes but does not require direct contact between the first object extending at an angle and the second object from which the first object extends.

The term "edge" refers to a boundary limiting an object (e.g., the base portion). This does not necessarily mean that there is a material boundary. For instance, the base portion can be directly connected to blade mounting portion (e.g., these elements can be formed from the same sheet of material) but nevertheless there can be an edge limiting the base portion.

The term "fixedly attached" relates to a permanent or non-detachable attachment. For instance, a weld connection or an adhesive can be used to fixedly attach two objects. Two objects connected by a screw connection or a clip connection or by friction/releasable pressing forces, on the other hand, are not "fixedly attached".

DETAILED DESCRIPTION

Figure 1:
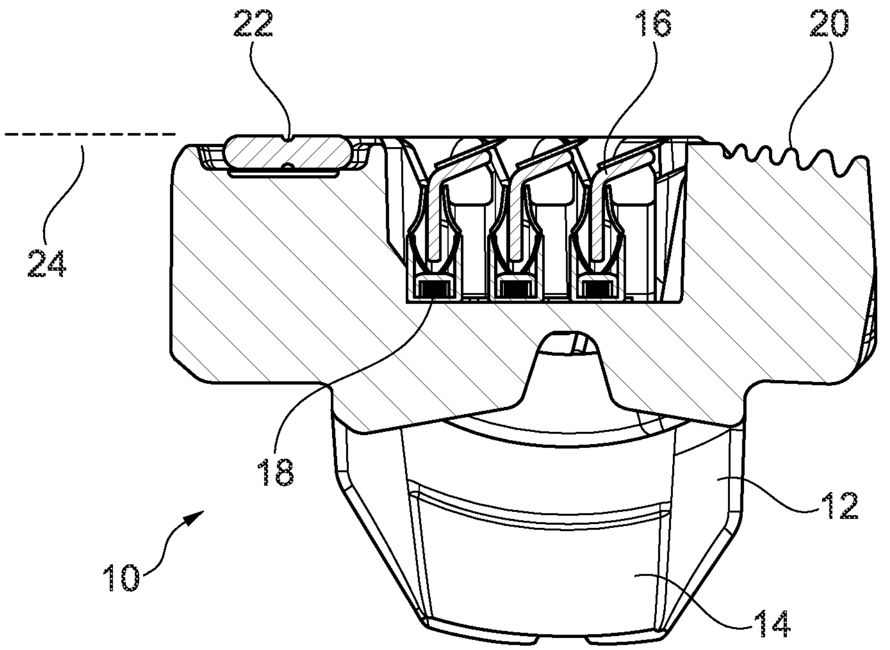
FIG. 1 illustrates a side-view of a shaving head with respective blade angle control base parts according to the present disclosure.

FIG. 1 shows a side-view of a shaving head 10 with respective blade angle control bases according to the present disclosure.

As shown in FIG. 1, the shaving head 10 comprises a housing 12 configured to couple the shaving head 10 to a shaving head holder. To that end, the shaving head 10 may include a connector 14 for a shaving head holder. The connector 14 or the connection can be released by means of a mechanism e.g., in form of a press button or the like.

The shaving head 10 further comprises one or more cutting members 16 e.g., a plurality of cutting members 16. In an example one to five or three cutting members 16 are provided. The cutting members 16 are explained in greater detail in FIG. 2.

The shaving head 10 further comprises one or more base parts 18 configured to hold one cutting member 16 and to couple it to the housing 12. The base parts 18 also allow for blade angle control. The base parts 18 are explained in greater detail in FIG. 2.

In an example, one base part 18 is provided for a single cutting member 16. In other examples, two base parts 18 are provided for a single cutting member 16. The base parts 18 may be permanently fixed to the housing 12. The base parts 18 may be arranged inside a recess of the housing 12.

The shaving head 10 may include a guard bar 20 which leads the cutting members 16 during shaving and soothes the skin. The shaving head 10 may further comprise a lubricating strip 22 or the like which trails the cutting members 16 during shaving and comforts the skin. The base parts 18 are located in between the guard bar 20 and the lubricating strip 22.

The guard bar 20 and the strip 22 define a shaving plane 24 of the shaving head 10. The shaving plane 24 is defined in this example as a tangential line intersecting the highest points of the cartridge e.g., of the guard bar 20 and the strip 22. Alternatively, the shaving plane 24 can be defined as a tangential line intersecting each cutting edge 30*a*. The shaving plane 24 is the contact area between the shaving head 10 and the skin. In FIG. 1, the shaving plane 24 would extend in a right angle to the plane of the paper i.e., it would extend out of the drawing plane.

Figure 2:
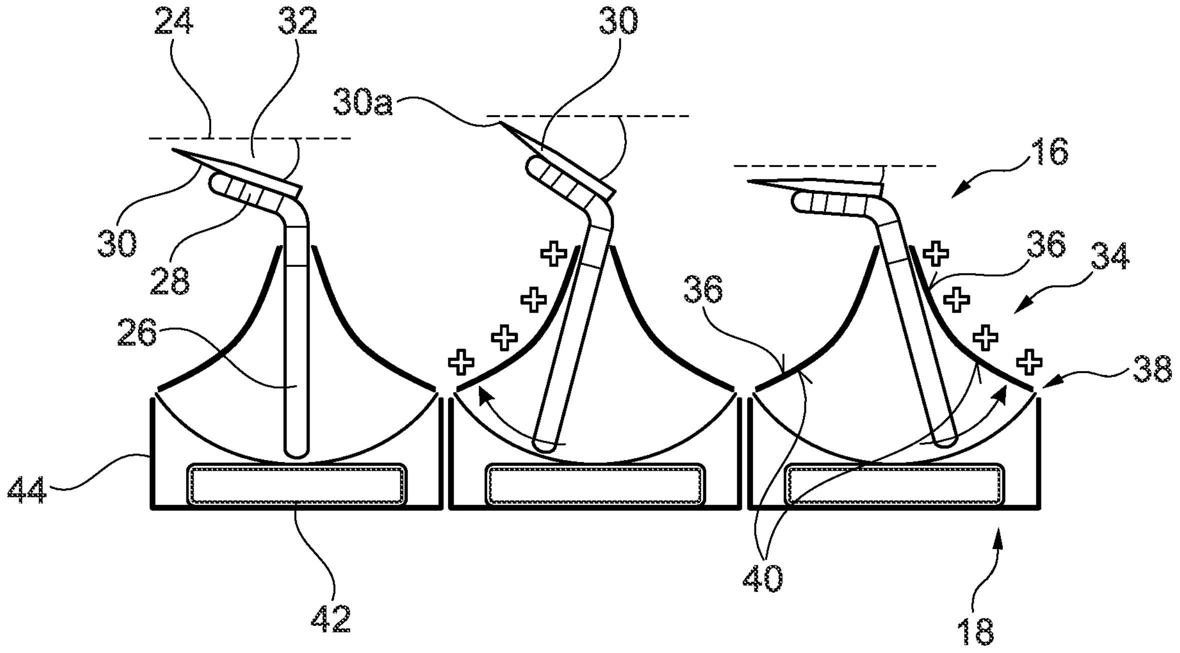
FIG. 2 illustrates positioning of the blade angle control base parts according to the present disclosure.

FIG. 2 illustrates positioning of the base part 18 according to the present disclosure. FIG. 2 could depict the three base parts 18 of the shaving head 10 shown in FIG. 1. Alternatively, FIG. 2 can depict possible positions of the same base part 18.

Each cutting member 16 comprises a base portion 26 and a blade mounting portion 28 connected to the base portion 26. The blade mounting portion 28 extends at an angle from the base portion 26. In other words, the cutting member 16 may be L-shaped. A blade 30 with a cutting edge portion 30*a* is connected to the blade mounting portion 28. The blade 30 is orientated at a shaving angle 32 of the blade 30, wherein the shaving angle 32 is an angle between the blade 30 and the shaving plane 24 of the shaving head 10. The blade 30 may be mounted either on an outer surface of the mounting surface i.e., on top of the blade mounting portion 28 or on an inner surface i.e., below the blade mounting portion 28.

The cutting member 16 can be supported by one base part 18 which can be located at a middle part of the cutting edge portion 30*a*. In an example, a single cutting member 16 can be supported by two base parts 18 which are opposed to each other in a direction perpendicular to the shaving or movement direction of the shaving head 10.

The cutting edge portion 30*a* or the blade 30 may comprise two end parts which are opposed in a direction perpendicular to the shaving or movement direction of the shaving head 10. The blade 30 is attached to the cutting member 16 at least at the two end parts and a pair of base parts 18 is coupled to the cutting member 16.

According to the present description, the blades 30 are moveable within the base parts 18. The blades 30 may be enabled to provide automated, precise, and repeatable shaving angle control, e.g., through a combined electrostatic actuator and piezoelectric sensor system. Such an electrostatic actuator blade holding structure may hold the cutting member 16 or the blade in a way that allows it to rotate so that the shaving angle 32 can be altered through actuation of the two sides of the cutting member 16. The base part 18 may not cover the full length of the cutting member 16, to avoid reducing the rinsability of the shaving head. The base part 18 may cover the full length or almost the full length of the base portion 26.

The base part 18 comprises an actuator which is configured to rotate the cutting member 16 around the axis of rotation thereby varying the shaving angle 32 of the blade 30. The axis of rotation may be located in a transition portion of the base portion 26 and the blade mounting portion 28. In an example, the axis of rotation may be located in the cutting edge portion 30*a* of the blade 30 so that exposure is not changed during shaving angle change.

The actuator may be an electrostatic actuator 34 and the base portion 26 of the cutting member 16 may include an electrical conductor (not shown). Then, the actuator 34 may include at least one electrode 36 located at the base part 18. The electrode 36 is integrated into a side wall section 38 of the base part 18. In an example, the actuator 34 includes two electrodes 36 located on opposing side wall sections 38 of the base portion 26. A side of the electrode 36 which faces the base portion 26 may be covered with an insulator 40. The electrode 36 and/or the side wall section 38 may extend in parallel to the axis of rotation. The side wall section 38 may have a convex shape oriented towards the base portion 26. Such design supports a pendulum motion of the cutting member 16.

Thus, the base part 18 enables a swinging movement of the cutting member 16 to change or adapt the shaving angle 32 of the blade 30 of the cutting member 16. This blade movement is induced by the (electrostatic) actuator 34. The blade movement may be a positioning or adjusting movement different from oscillating blade movements which can be used to vibrate the blade.

The cutting members 16 of the shaving head 10 can move synchronously or identically i.e., in the same direction, arc, time etc. This could be utilized e.g., for a "sensitivity setting" application. In other examples, the cutting members 16 can move completely opposite to each other i.e., in the same arc, time etc. but in an opposite direction. This could be utilized e.g., for an "easy rinsing" application. In other examples, the cutting members 16 can move independently from each other in all aspects i.e., each blade angle can stabilized by counteracting on its specific angle or pressure reading. This could be utilized e.g., for a "stability" application.

In an example, the actuator may be an electro-pneumatic pump e.g., including at least one artificial muscle which can be inflated and deflated by the electro-pneumatic pump and is in connection with the base portion 26.

The electrode 36 is configured to apply a force to the base portion 26 of the cutting member 16 when a voltage is applied across the electrode 36 and the electrical conductor of the base portion 26.

The cutting member 16 depicted left in FIG. 2, is in a center or idle position. The actuator 34 or its electrodes 36, respectively are not activated.

The cutting member 16 depicted middle in FIG. 2, is in a dislocated or high position. The actuator 34 or a left electrode 36, respectively is activated. Here, the left electrode 36 corresponds to a leading electrode with regard to a direction of shaving or movement of the shaving head 10. A positive voltage is applied across the electrode 36 and the base portion 26. As a result, attractive forces move the base portion 26 towards the electrode 36 thereby rotating the cutting member 16. This rotation leads to an increase of the shaving angle 32 of the blade 30.

The cutting member 16 depicted right in FIG. 2, is in a dislocated or low position. The actuator 34 or a right electrode 36, respectively is activated. Here, the right electrode 36 corresponds to a trailing electrode with regard to a direction of shaving or movement of the shaving head 10. A positive voltage is applied across the electrode 36 and the base portion 26. As a result, attractive forces move the base portion 26 towards the electrode 36 thereby rotating the cutting member 16. This rotation leads to a decrease of the shaving angle 32 of the blade 30.

The cutting member 16 returns from the dislocated positions e.g., supported by spring force and/or by applying the opposed voltage. An opposed voltage could be a negative voltage or a positive voltage at the other electrode. In this example, voltages based on the effect of electrostatic attraction have been described. Of course, voltages based on the effect of electrostatic repulsion can be utilized as well.

The cutting member 16 may be held by a fixed rotational axis inside base part 18. Alternatively or additionally, the cutting member 16 may be held by the electrostatic actuator 34.

The base part 18 may further comprise a sensor 42 configured to detect pressure and/or movement of the cutting member 16. In this example, the sensor 42 is a pressure sensor such as a piezoelectric sensor. The sensor 42 can receive and read pressure from the holding structure of the base part 18 located above the sensor 42.

The sensor 42 is located or embedded in a bottom section 44 of the base part 18. The sensor may be created by the same 3D printing process by which the bottom section 44 or the whole base part 18 is produced. This can be achieved by e.g., a hybrid printing technique that allows for both functional and structural materials to be printed from a single platform. Such process allows for an embedded sensor 42.

In other examples, the sensor 42 may include the electrostatic actuator 34 which is then configured to detect an angle and/or a change of an angle of the base portion 26 of the cutting member 16 by electrical detection.

In other examples, the sensor 42 may include at least one distance sensor at the side wall section 38 of the base part 18 for detecting an angle and/or a change of an angle of the base portion 26 of the cutting member 16.

In a still further example, the sensor may include at least one shaving force sensor associated with the blade and configured to detect a pressure applied to the blade.

The sensor 42 may determine how much pressure a user is applying to his/her skin during use. For example, sensors may include one or more piezoelectric or piezoresistive pressure sensors or transducers. Sensors may be located on one or more blades, on a surface of the shaving head configured to support one or more blades, on a surface of the shaving head configured to contact the skin of a user during a shaving event, at a base of the shaving head (e.g., where the shaving head connects to a handle), and/or on a distal region of the handle in line with the shaving head (when connected), or a combination of locations.

For example, the sensor may be a thin-film pressure sensor that extends along at least a portion of the blade configured to contact a user's skin. In some aspects, the sensor may be located where the blade contacts or otherwise connects with the shaving head so that the sensor detects any force applied to the blade as the blade is pushed against the skin and thereby compresses against the shaving head. In some aspects, the sensor may be located separate from the blade, e.g., on a region of the shaving head that contacts the skin, or on a region of the shaving head to which pressure applied to the blades would be transmitted during shaving, e.g., a center region of the shaving head or a region where the shaving head contacts or is otherwise connected to the handle. In some embodiments, the sensor may be located on a region of the handle where the shaving head meets the handle, so that pressure transferred from the shaving head to the handle is measured by one or more sensors. It is contemplated that one sensor or a plurality of sensors may be located in any suitable location or combination of locations on the shaver.

The sensor reading or readings may be used to control the electrostatic actuator 34 which is described in the following.

Figure 3:
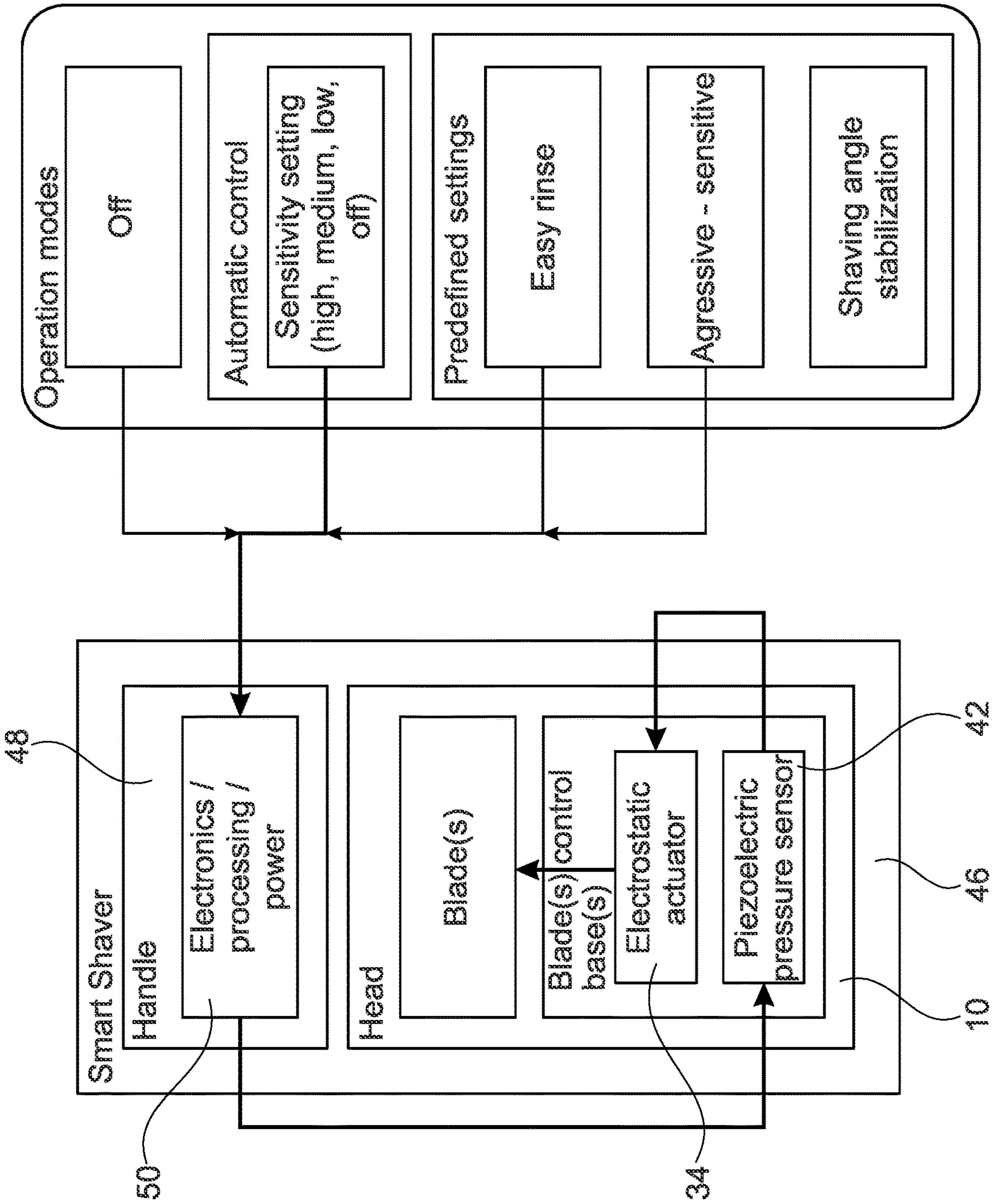
FIG. 3 illustrates an overview of a razor system and a process flow diagram according to the present disclosure.

FIG. 3 illustrates an overview of a razor system 46 and a process flow diagram according to the present disclosure. The modular razor system 46 includes the shaving head 10 and a razor handle 48 according to the present disclosure. The modular razor system 46 can equal to a kit of parts including the shaving head 10 and the razor handle 48 wherein the shaving head 10 is coupled to the razor handle 48. The shaving head 10 can correspond to the shaving head 10 as depicted in FIG. 1.

The razor handle 48 comprises a processing unit 50 and a power supply, wherein the processing unit 50 is configured to control the actuator 34. The shaving head 10 and the razor handle 48 include connections for power supply and signal propagation. The connections are detachable for a modular razor system 46. The processing unit 50 is connected with the sensor 42 and can control the actuator 34 based on an output of the sensor 42.

The razor handle 48 may comprise a user interface configured to receive a user input and/or to indicate a status of the razor system 46 to a user. The user interface may include a touch panel.

The user is provided with the ability to choose automatic shaving angle control modes. This can be input via the user interface or through an application on a smart device like e.g., a smart phone, tablet, or the like which is connected with a smart shaver.

Example indicative operating modes can be:

1. Off.
2. Automatic Control sensitivity (high, medium, low, off).
3. Predefined settings, e.g., for:
   Easy rinsing.
   Aggressive—sensitive angle.
   Shaving angle stabilization.

The user may have the option to choose operating modes or specific purpose options to be pre-set. As an example, the following functionality may be provided under these operating modes:

1. Off: No shaving angle control is employed and shaver functions as normal.
2. Automatic control sensitivity (high, medium, low, off): Automatic shaving angle is controlled as described above but the force threshold has three levels i.e., high, medium, low. The sensitivity levels may be either determined through user experience panels of different sensitivity users or through a multiplying gain, tested in user panels. Off is allowed to remove automation and allow for below predefined settings and is rather automatically activated when a predefined setting is chosen than manually chosen by the user (as it would have the same effect as 1).
3. Predefined settings may be provided e.g., for:

Easy rinsing: Consecutive blades are driven away from one another sequentially so as to increase the gap between them and allow for easier rinsing. This could preferably be a "sweeping" action, through which each blade is swung between its two extreme positions, with consecutive blades having opposite directions. If a single blade is used, then this can be swung to allow distancing between the top and bottom sides of the blade frame.

Aggressive—sensitive angle: Aggressive setting will drive the angle to a high position for users requiring a more aggressive shave while sensitive to a low position. The positions i.e., optimum high/low angle may be defined by respective user experience panels as indicated above. Of course, any manual intermediate position can be made available to the user.

Shaving angle stabilization: Especially for examples in which force is measured as a tendency of angle change or blade back/support distance from side walls, it is possible to identify these changes and respond through the actuator with an opposite action, so as to limit fluctuation of the shaving angle. This may an automatic mode with a closed loop control including the sensor 42, the actuator 34, and the processing unit 50.

Regardless of the implementations or the user choice, the shaving angle may always return to default or the idle position and not remain permanently in an inclined position. A main reason for such design, apart from reduced power consumption and possible mechanisms wear, is to assure contact of the blade with the retainer in the idle position to ensure respective scoped corrosion protection.

In other examples, the settings can be predefined and pre-set in the processing unit 50 for a specific function as for example shaving angle stabilization or providing a button for easy rinsing activation and provided without the option for the user to choose.

Figure 4:
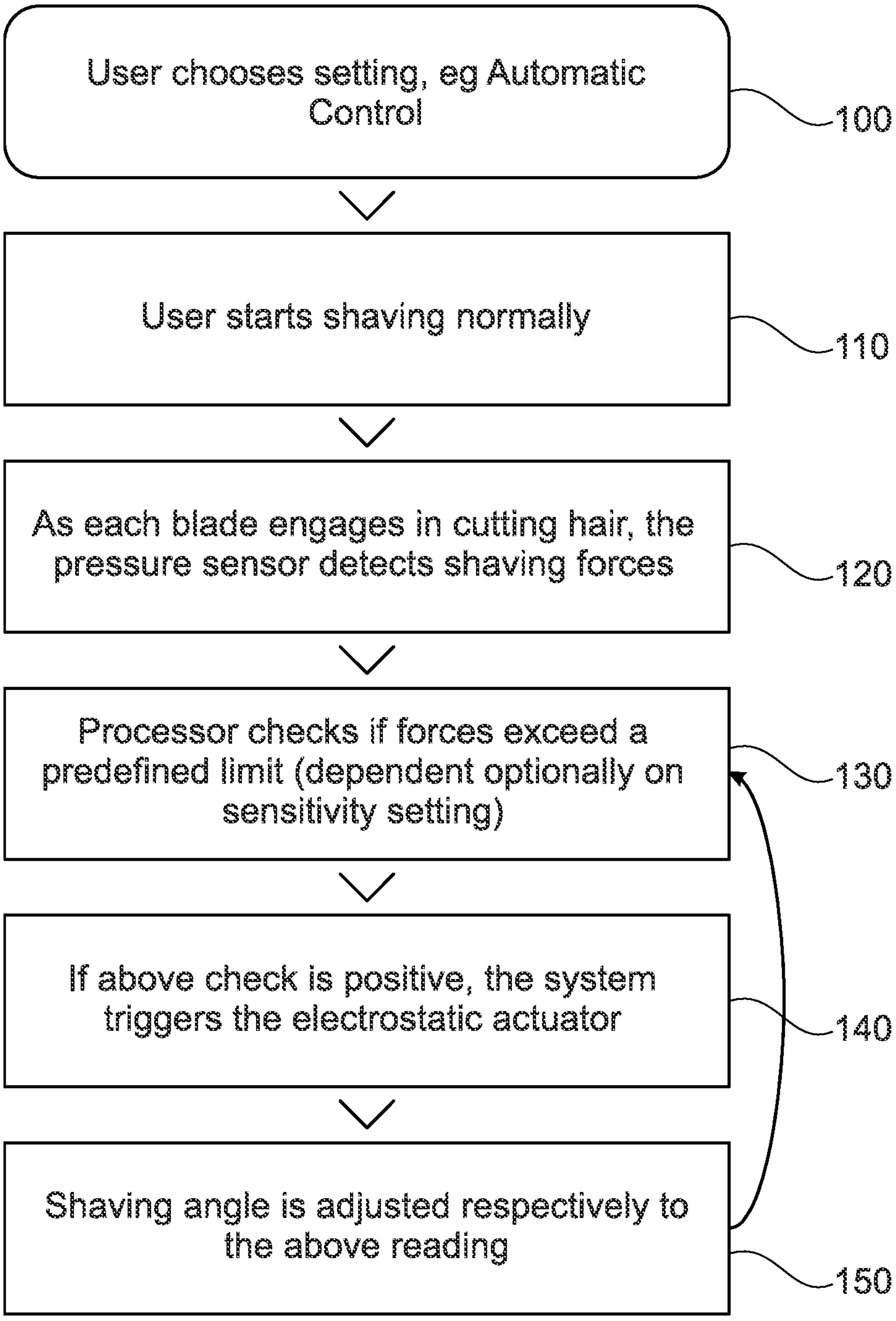
FIG. 4 illustrates an auto shaving angle control method flow chart according to the present disclosure.

FIG. 4 illustrates an auto shaving angle control method flow chart according to the present disclosure. The auto shaving angle control method could be or could be at least part of a method of operating a razor.

In a first step 100 of the method, the user chooses a setting as outlined above. This may include not to actively choose a specific setting but to start the razor in an automatic or default mode.

In a second step 110, the user starts shaving normally i.e., performs a shaving operation with the razor, wherein the shaving head is configured to cut hair of a user. The shaving head is moved in a shaving direction over the skin.

In a third step 120, the pressure sensor detects shaving forces for the one or more cutting members as each blade engages in cutting hair. Each cutting member may be connected with its own pressure sensor. The respective sensor readings or outputs may be averaged by the processing unit 50. Alternatively, each sensor information is evaluated on a single basis. This allows for dedicated control of each single cutting member.

In a fourth step 130, the processing unit 50 checks if forces exceed or are at a predefined limit(s) which may depend optionally on a sensitivity setting. The predefined limit(s) can be identified through mapping with panels of users and respective gauging of user experience in terms of shaving comfort, pain felt, hair cutting performance etc. This will allow to define force threshold limits, in response to user experience, e.g., limit for increased possibility of pain and even in different sets of users depending on skin and/or pain sensitivity.

In a fifth step 140, if the force is lower than this threshold, which defines that pain has reduced possibility to occur, the system remains idle. If the force is higher than this threshold, which defines that pain feeling has increased possibility to occur, the processing unit 50 triggers the electrostatic actuator to reduce the shaving angle. In certain applications, it may be implemented that the processing unit 50 triggers the electrostatic actuator to increase the shaving angle. This may be activated in cases in which the force is lower than a predefined threshold.

In a sixth step 150, the actuator reduces the shaving angle in case the detected shaving force is above or at a predefined limit. This may be achieved by rotating the one or more cutting members around an axis of rotation extending in parallel to the cutting edge portion by an actuator, thereby varying the shaving angle of the blade. The processing unit 50 controls the electrostatic actuator accordingly.

Then, the shaving angle may return to normal i.e., the shaving angle or the cutting member moves back to a center position. The varied or adapted blade position may remain either for a predetermined number of strokes in case the shaver is equipped with stroke counting or for a predetermined amount of time, which may be equivalent to an optimum number of strokes. The optimum number of strokes may be defined by a panel testing. This predetermined number of strokes or respective equivalent time may be sufficient to reduce the hair so as to create less pull, when the shaving angle returns to normal. The above procedure assures that if this is not achieved, then the process reiterates respectively.

Steps 130 to 150 may be continuously repeated so that a feedback loop is formed.

The present disclosure also relates to a shaving razor assembly including a modular razor and a razor cartridge like e.g., in form of the shaving head as described in the present disclosure. The razor cartridge can be releasably attached to the modular razor, e.g., via a pivotable connection. In other examples, the razor cartridge can be releasably attached to the modular razor via a non-pivotable connection. In still other examples, the razor cartridge can be integrally formed with the modular razor including a pivotable connection. In still other examples, the razor cartridge can be integrally formed with the modular razor including a non-pivotable connection.

The present disclosure also relates to the razor head holders, kits of parts, methods of assembling a razor and methods of disassembling a razor of the following aspects:

1. A shaving head comprising:
   a housing,
   one or more cutting members, comprising a base portion and a blade mounting portion connected to the base portion and extending at an angle therefrom,
   wherein a blade with a cutting edge portion is connected to the blade mounting portion,
   one or more base parts configured to hold one cutting member and to couple it to the housing,
   wherein the base portion is arranged in the one or more base parts rotatably around an axis of rotation extending in parallel to the cutting edge portion, and wherein the one or more base parts comprise an actuator which is configured to rotate the cutting member around the axis of rotation thereby varying a shaving angle of the blade, wherein the shaving angle is an angle between a blade and shaving plane of the shaving head.
2. The shaving head according to aspect 1, wherein the axis of rotation is located in a transition portion of the base portion and the blade mounting portion.
3. The shaving head according to aspect 1, wherein the axis of rotation is located in the cutting edge portion of the blade.
4. The shaving head according to one of aspects 1 to 3, wherein a single cutting member is supported by two base parts which are opposed to each other in a direction perpendicular to the shaving or movement direction of the shaving head, wherein the actuators of the two base parts are configured to move synchronized.
5. The shaving head according to one of aspects 1 to 3, wherein a cutting member is supported by one base part which is located at a middle part of the cutting edge portion.
6. The shaving head according to one of aspects 1 to 5, wherein the actuator is an electrostatic actuator and wherein the base portion of the cutting member includes an electrical conductor.
7. The shaving head according to aspect 6, wherein the actuator includes at least one electrode located at the base part configured to apply a force to the base portion of the cutting member when a voltage is applied across the at least one electrode and the base portion.
8. The shaving head according to aspect 7, wherein the electrode is integrated into a side wall section of the base part and wherein a side of the electrode which faces the base portion is covered with an insulator.
9. The shaving head according to one of aspects 6 to 8, wherein the electrode and/or the side wall section extends parallel to the axis of rotation.
10. The shaving head according to aspect 8 or 9, wherein the side wall section has a convex shape oriented towards the base portion.
11. The shaving head according to one of aspects 7 to 10, wherein the actuator includes two electrodes located on opposing sides of the base portion.
12. The shaving head according to one of aspects 1 to 5, wherein the actuator is an electro-pneumatic pump.
13. The shaving head according to aspect 11, wherein the electro-pneumatic pump includes at least one artificial muscle which can be inflated and deflated by the electro-pneumatic pump and is in connection with the base portion.
14. The shaving head according to one of aspects 1 to 13, wherein the base part comprises a sensor configured to detect pressure and/or movement of the cutting member.
15. The shaving head according to aspect 14, wherein the sensor comprises a pressure sensor such as a piezo-electric sensor embedded in a bottom section of the base part.
16. The shaving head according to aspect 15, wherein the pressure sensor is created by the same 3D printing process as the bottom section of the base part.
17. The shaving head according to aspect 14 and one of aspects 6 to 11, wherein the sensor comprises the electrostatic actuator configured to detect an angle and/or a change of an angle of the base portion of the cutting member by electrical detection.
18. The shaving head according to aspect 14, wherein the sensor comprises at least one distance sensor at the side wall section of the base part configured for detecting an angle and/or a change of an angle of the base portion of the cutting member.
19. The shaving head according to aspect 14, wherein the sensor comprises at least one shaving force sensor associated with the blade and configured to detect a pressure applied to the blade.
20. A kit of parts, comprising:
   a shaving head according to any one of the preceding aspects, and
   a razor handle wherein the shaving head is coupled to the razor handle.
21. The kit of parts according to aspect 20, wherein the razor handle comprises a processing unit and a power supply, wherein the processing unit is configured to control the actuator.
22. The kit of parts according to aspect 20 or 21, wherein the base part of the shaving head comprises a sensor configured to detect pressure and/or movement of the cutting member and wherein the processing unit is connected with the sensor and configured to control the actuator based on an output of the sensor.
23. The kit of parts according to one of aspects 20 to 22, wherein the razor handle comprises a user interface configured to receive a user input and/or to indicate a status to a user.
24. The kit of parts according to one of aspects 20 to 23, wherein the processing unit is configured to execute a method according to one of aspects 25 to 37.
25. A method of operating a razor, comprising the steps of:
   a) providing a razor with a shaving head comprising one or more cutting members each comprising a base portion and a blade mounting portion connected to the base portion and extending at an angle therefrom, wherein a blade with a cutting edge portion is connected to the blade mounting portion, b) performing a shaving operation with the razor, wherein the shaving head is configured to cut hair of a user, c) rotating the one or more cutting members around an axis of rotation extending in parallel to the cutting edge portion by an actuator, thereby varying a shaving angle of the blade.

26. The method of operating a razor according to aspect 25, wherein the base portion is rotatably arranged in one or more base parts of the shaving head and wherein the actuator is arranged in the base part.

27. The method of operating a razor according to aspect 25 or 26, wherein step c) includes c1) detecting a shaving force for the one or more cutting members, c2) determining whether the detected shaving force is above or at a predefined limit, c3) reducing the shaving angle in case the detected shaving force is above or at a predefined limit, c4) optionally returning the shaving angle to a center position, and c5) repeating the above steps.

28. The method of operating a razor according to one of aspects 25 to 27, wherein an amount and/or a direction of rotation of the one or more cutting members is selected from different predefined settings.

29. The method of operating a razor according to aspect 28, wherein the selecting is provided by a user.

30. The method of operating a razor according to one of aspects 25 to 29, wherein a shaving force is measured at the base portion of the cutting member.

31. The method of operating a razor according to aspect 30, wherein the shaving angle is adjusted automatically based upon the measuring.

32. The method of operating a razor according to aspect 31, wherein the automatic adjusting includes at three sensitivity levels.

33. The method of operating a razor according to aspect 30 or 32, wherein the shaving angle is stabilized based upon the measuring.

34. The method of operating a razor according to aspect 30 or 31, comprising a step of rinsing in which the one or more cutting members are moved away from each other.

35. The method of operating a razor according to aspect 34, wherein each cutting member is rotated between its two extreme positions and wherein consecutive cutting members are rotated in opposite directions.

36. The method of operating a razor according to one of aspects 25 to 35, wherein the one or more cutting members return to a center position after being rotated.

37. The method of operating a razor according to aspect 36, wherein the one or more cutting members return to the center position after a predetermined number of strokes is measured or after a predetermined period of time.

The invention claimed is:

1. A method of operating a razor, comprising the steps of:

a) providing a razor with a shaving head comprising one or more cutting members each comprising a base portion and a blade mounting portion connected to the base portion and extending at an angle therefrom, wherein a blade with a cutting edge portion is connected to the blade mounting portion, and one or more base parts configured to hold one or more cutting member members and to couple the one or more cutting members to a housing, b) performing a shaving operation with the razor, wherein the shaving head is configured to cut hair of a user, and c) rotating the one or more cutting members around an axis of rotation extending in parallel to the cutting edge portion by an actuator, thereby varying a shaving angle of the blade, wherein the one or more cutting members are rotated around the axis of rotation by applying voltage across at least one electrode of an actuator located in the one or more base parts and across the base portion such that the base portion is attracted to the at least one electrode.

2. The method of operating the razor according to claim 1, wherein step c) includes c1) detecting a shaving force for the one or more cutting members, c2) determining whether the detected shaving force is above or at a predefined limit, c3) reducing the shaving angle in case the detected shaving force is above or at a predefined limit, c4) optionally returning the shaving angle to a center position, and c5) repeating the above steps.

3. The method of operating the razor according to claim 1, wherein the one or more cutting members return to a center position after being rotated.

4. The method of operating the razor according to claim 3, wherein the one or more cutting members return to the center position after a predetermined number of strokes is measured or after a predetermined period of time.

5. A shaving head comprising:

a housing, one or more cutting members, each comprising a base portion and a blade mounting portion connected to the base portion and extending at an angle therefrom, wherein a blade with a cutting edge portion is connected to the blade mounting portion, and one or more base parts configured to hold the one or more cutting members and to couple the one or more cutting members to the housing, wherein the base portion of the one or more cutting members is arranged in each of the one or more base parts rotatably around an axis of rotation extending in parallel to the cutting edge portion, and wherein the one or more base parts comprise an actuator which is configured to rotate the one or more cutting members around the axis of rotation thereby varying a shaving angle of the blade, wherein the shaving angle is an angle between the blade and a shaving plane of the shaving head, and wherein the one or more cutting members are configured to rotate around the axis of rotation by applying voltage across at least one electrode of the actuator located in the one or more base parts and across the base portion, such that the base portion is attracted to the at least one electrode.

6. The shaving head according to claim 5, wherein the axis of rotation is located in a transition portion of the base portion and the blade mounting portion.

7. The shaving head according to claim 5, wherein the axis of rotation is located in the cutting edge portion of the blade.

8. The shaving head according to claim 5, wherein a first cutting member of the one or more cutting members can be is supported by two base parts of the one or more base parts which are opposed to each other in a direction perpendicular to a shaving or movement direction of the shaving head.

9. The shaving head according to claim 5, wherein the actuator is an electrostatic actuator and wherein the base portion of the one or more cutting members includes an electrical conductor.

10. The shaving head according to claim 9, wherein the one or more base parts comprises a sensor configured to detect pressure and/or movement of the one or more cutting members, wherein the sensor comprises the electrostatic actuator configured to detect an angle and/or a change of an angle of the base portion of the one or more cutting members by electrical detection.

11. The shaving head according to claim 5, wherein the at least one electrode is integrated into a side wall section of the one or more base parts and wherein a side of the electrode which faces the base portion is covered with an insulator.

12. The shaving head according to claim 5, wherein the at least one electrode includes a first electrode and a second electrode located on opposing sides of the base portion.

13. The shaving head according to claim 5, wherein the actuator is an electro-pneumatic pump.

14. The shaving head according to claim 5, wherein the one or more base parts comprises a sensor configured to detect pressure and/or movement of the one or more cutting members.

15. The shaving head according to claim 14, wherein the sensor is located in a bottom section of the one or more base parts, and further wherein the sensor is located directly below the base portion of the one or more cutting members.

16. A kit of parts, comprising:

a shaving head according to claim 1, and a razor handle wherein the shaving head is coupled to the razor handle.

17. The kit of parts according to claim 16, wherein the razor handle comprises a processing unit and a power supply, wherein the processing unit is configured to control the actuator.

18. The kit of parts according to claim 17, wherein the one or more base parts of the shaving head comprises a sensor configured to detect pressure and/or movement of the one or more cutting members and wherein the processing unit is connected with the sensor and configured to control the actuator based on an output of the sensor.

19. The kit of parts according to claim 17, wherein the razor handle comprises a user interface configured to receive a user input and/or to indicate a status to a user.

20. The shaving head according to claim 5, wherein the one or more cutting members are further rotated around the axis of rotation by applying voltage across a second electrode of the actuator located in the one or more base parts such that the base portion is repulsed by the second electrode.

* * * * *